US011513870B2

(12) United States Patent
Luo et al.

(10) Patent No.: US 11,513,870 B2
(45) Date of Patent: Nov. 29, 2022

(54) METHOD, DEVICE, AND COMPUTER PROGRAM PRODUCT FOR MANAGING A TASK IN AN APPLICATION NODE

(71) Applicant: EMC IP Holding Company LLC, Hopkinton, MA (US)

(72) Inventors: Yuan Luo, Shanghai (CN); Jia Zhuo, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/888,302

(22) Filed: May 29, 2020

(65) Prior Publication Data

US 2021/0216379 A1 Jul. 15, 2021

(30) Foreign Application Priority Data

Jan. 15, 2020 (CN) .......................... 202010042349.7

(51) Int. Cl.
*G06F 9/54* (2006.01)
*G06F 9/48* (2006.01)
*G06F 9/50* (2006.01)

(52) U.S. Cl.
CPC ............ *G06F 9/542* (2013.01); *G06F 9/4856* (2013.01); *G06F 9/5088* (2013.01)

(58) Field of Classification Search
CPC ....... G06F 9/542; G06F 9/5088; G06F 9/4856
See application file for complete search history.

(56) References Cited

U.S. PATENT DOCUMENTS

| | | | |
|---|---|---|---|
| 6,275,953 B1 * | 8/2001 | Vahalia | G06F 11/0709 714/11 |
| 9,904,585 B1 * | 2/2018 | Islam | G06F 11/079 |
| 2003/0194126 A1 * | 10/2003 | Shin | G06K 9/4652 382/164 |
| 2006/0044582 A1 * | 3/2006 | Seaman | H04N 1/00962 358/1.13 |
| 2006/0168522 A1 * | 7/2006 | Bala | G06Q 10/00 715/713 |
| 2008/0071403 A1 * | 3/2008 | Conway | C30B 1/02 700/97 |
| 2010/0123923 A1 * | 5/2010 | Katoh | H04N 19/423 358/1.15 |

(Continued)

*Primary Examiner* — S. Sough
*Assistant Examiner* — Carina Yun
(74) *Attorney, Agent, or Firm* — Amin, Turocy & Watson, LLP

(57) ABSTRACT

A task in an application node is managed. For instance, based on a type of a predetermined task that is to be executed on a data object in the application node, an address range of a group of objects on which the predetermined task is to be executed is determined in the data object. The predetermined task is executed on the group of objects in an order of addresses of the group of objects. A progress indicator is created for indicating an address of an object that is currently being processed in the group of objects. The predetermined task is managed based on the progress indicator. Thus, an address of an object that is currently being processed may be indicated based on the progress indicator, so that the predetermined task may be managed more easily and effectively based on the progress indicator in subsequent operations.

20 Claims, 10 Drawing Sheets

(56) References Cited

U.S. PATENT DOCUMENTS

| | | | | |
|---|---|---|---|---|
| 2012/0147226 A1* | 6/2012 | Takatori | ................... | G06T 5/20 |
| | | | | 348/246 |
| 2012/0254342 A1* | 10/2012 | Evans | ................. | G06F 11/2064 |
| | | | | 709/214 |
| 2019/0016419 A1* | 1/2019 | Sheldon-Coulson | ........................ | |
| | | | | H04L 9/3239 |
| 2019/0391960 A1* | 12/2019 | Luo | ....................... | G06F 16/178 |

\* cited by examiner

METHOD, DEVICE, AND COMPUTER PROGRAM PRODUCT FOR MANAGING A TASK IN AN APPLICATION NODE

RELATED APPLICATION

The present application claims the benefit of priority to Chinese Patent Application No. 202010042349.7, filed on Jan. 15, 2020, which application is hereby incorporated into the present application by reference herein in its entirety.

FIELD

Various embodiments of the present disclosure relate to task management, and more specifically, to a method, device and computer program product for managing a task in an application node.

BACKGROUND

With developments of computer technology and network technology, a large number of application nodes have emerged. An application node may execute a task independently or in conjunction with another application node. With an increase of the amount of data in data objects in the application node, it takes more time to execute the task. Since the application node may fail and be faced with a restart, the task has to be interrupted. Therefore, it has become a focus of research on how to manage data objects during executing a task so as to guarantee the smooth execution of the task.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Therefore, it is desirable to develop and implement a technical solution for managing a task in an application node more effectively. It is desired that the technical solution may be compatible with existing development environments and a task may be effectively executed by reconstructing configurations of existing development environments.

According to a first aspect of the present disclosure, a method is provided for managing a task in an application node. In the method, based on a type of a predetermined task to be executed on a data object in the application node, an address range of a group of objects on which the predetermined task is to be executed is determined in the data object. The predetermined task is executed on the group of objects in an order of addresses of the group of objects. A progress indicator is created for indicating an address of an object that is currently being processed in the group of objects. The predetermined task is managed based on the progress indicator.

According to a second aspect of the present disclosure, an electronic device is provided, the electronic device comprising: at least one processor; and a memory coupled to the at least one processor, the memory having instructions stored thereon, the instructions, when executed by the at least one processor, causing the device to perform acts for managing a task in an application node. The acts include: based on a type of a predetermined task that is to be executed on a data object in the application node, determining in the data object an address range of a group of objects on which the predetermined task is to be executed; executing the predetermined task on the group of objects in an order of addresses of the group of objects; creating a progress indicator for indicating an address of an object that is currently being processed in the group of objects; and managing the predetermined task based on the progress indicator.

According to a third aspect of the present disclosure, a computer program product is provided. The computer program product is tangibly stored on a non-transitory computer-readable medium and comprises machine-executable instructions which are used to implement operations comprising, based on a type of a defined task to be executed on a data object in the application node, an address range of a group of objects on which the defined task is to be executed is determined in the data object. The defined task is executed on the group of objects in an order of addresses of the group of objects. A progress indicator is created for indicating an address of an object that is currently being processed in the group of objects. The defined task is managed based on the progress indicator.

BRIEF DESCRIPTION OF THE DRAWINGS

Through a more detailed description in the accompanying drawings, features, advantages and other aspects of the embodiments, the present disclosure will become more apparent. Several embodiments of the present disclosure are illustrated schematically and are not intended to limit the present embodiments. In the drawings.

DETAILED DESCRIPTION

Various embodiments of the present disclosure will be described in more detail with reference to the drawings. Although the drawings illustrate the various embodiments of the present disclosure, it should be appreciated that the present disclosure can be implemented in various ways and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text can also comprise other explicit and implicit definitions.

Figure 1:
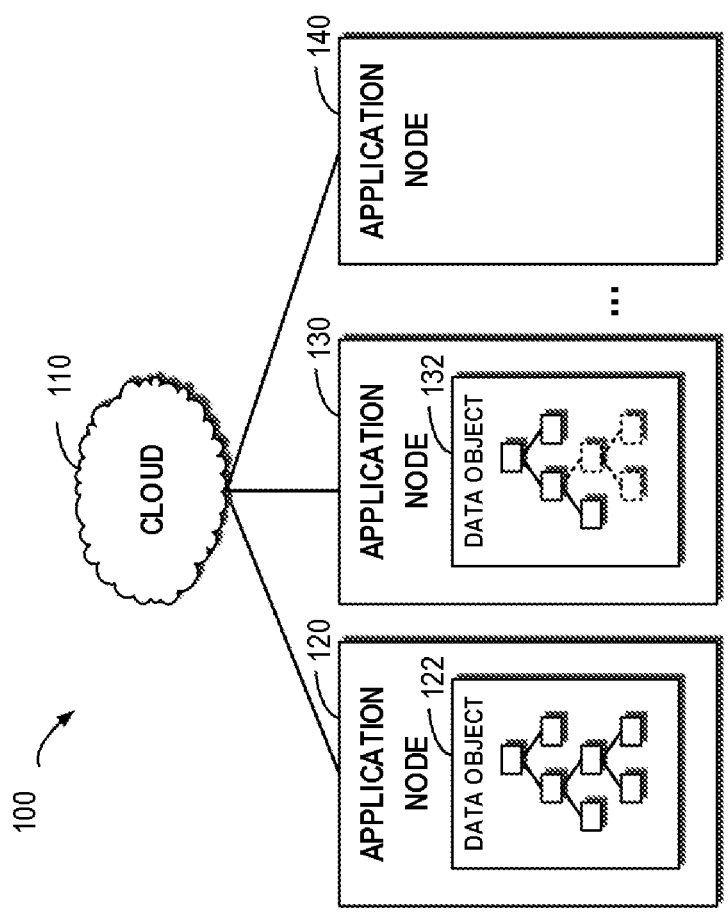
FIG. 1 schematically shows a block diagram of an application environment in which example embodiments of the present disclosure may be implemented.

Now there are various types of application nodes. A user may execute a predetermined task on a data object in an application node or across different application nodes. FIG. 1 schematically shows a block diagram of an application environment 100 in which example embodiments according to the present disclosure may be implemented. In FIG. 1, the application environment 100 may comprise application nodes 120, 130, . . . , and 140, and these application nodes may communicate via a cloud 110.

An application node may be used to perform various functions and may comprise one or more data objects. For example, the application node 120 may comprise a data object 122. The data object may comprise a tree-like storage structure, e.g., the data object 122 may comprise a directory and/or a file. In one example, the data object 122 may comprise one or more directories, the directory comprising a plurality of subdirectories each of which comprises an image file. A synchronization task may be executed on the data object 122 so as to synchronize all data of the data object 122 to the application node 130. A processing task may further be executed on the data object 122 so as to locally store a processed image file or in the application node 130.

During executing a predetermined task, the application node 120 may fail, and thus the predetermined task is interrupted and the application node 120 has to be restarted. Suppose the predetermined task is to synchronize the data object 122 from the application node 120 to the application node 130, and the application node 120 is restarted before the task ends. At this point, only a portion of the data object 122 has been synchronized to the application node 130, and an incomplete data object 132 (a dotted portion has not been synchronized) is formed in the application node 130. After the application node 120 is restarted, the synchronization task has to be re-executed, which results in great overheads of time and computing resources.

In order to overcome drawbacks in the above technical solutions, example embodiments of the present disclosure propose a progress indicator, which may point to an object which is currently being processed within an address range (determined based on the type of a predetermined task) on which the predetermined task is executed. In this way, a state that the predetermined task is executed may be recorded, and then the predetermined task may be managed based on the progress indicator. First, a brief description is presented below for example embodiments of the present disclosure with reference to FIG. 2. This figure schematically shows a block diagram 200 of a procedure for managing a task in an application node according to example embodiments of the present disclosure.

Figure 2:
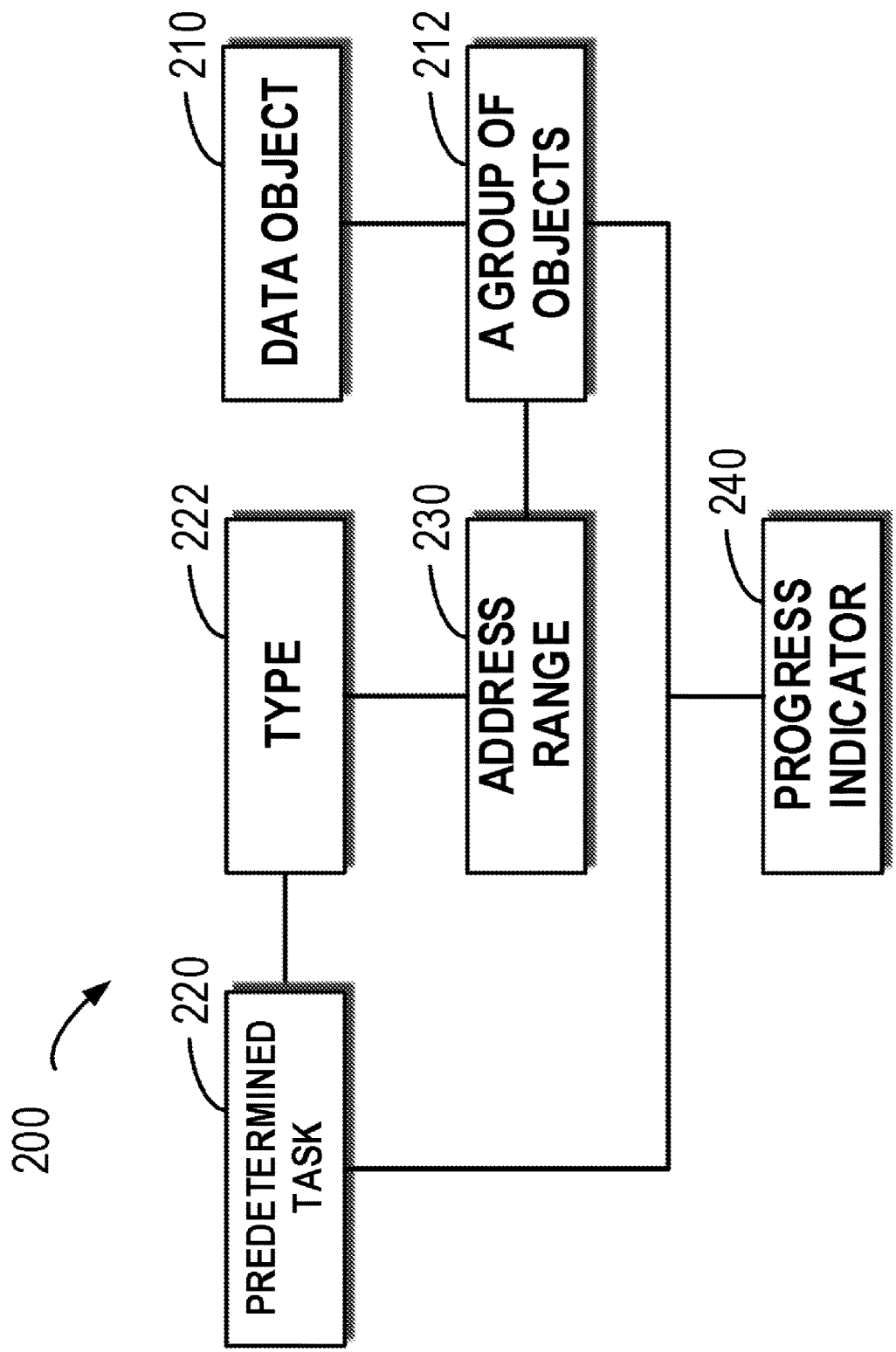
FIG. 2 schematically shows a block diagram of a procedure for managing a task in an application node according to example embodiments of the present disclosure.

As shown in FIG. 2, first, a task type 222 of a predetermined task 220 may be determined, and an address range 230 of a group of objects 212 on which the predetermined task 220 will be executed among data object 210 may be determined based on the task type 222.

The predetermined task 220 may be executed on the group of objects 212 in an order of addresses of the group of objects 212. During executing the predetermined task 220, a progress indicator 240 may be created for indicating an address of an object which is currently being processed in the group of objects 212, and subsequently the predetermined task 220 may be executed based on the progress indicator 240.

According to example embodiments of the present disclosure, the predetermined task 220 performs different processing operations on the data object 210. In one simple example, the predetermined task 220 may comprise a synchronization task, which is used for synchronizing data from one application node to another. For example, the data object 210 may comprise at least one of a directory and a file, and the to-be-synchronized data object 210 may comprise a directory that may further comprise one or more directories and files. At this point, the synchronization task needs to synchronize all directories and files under the data object 210 from the application node 120 to the application node 130.

In another example, the predetermined task 220 may comprise a processing task, specific steps of which may be defined by a function. For example, the processing task may comprise an image processing task (e.g., removing noise in an image, adjusting the contrast and/or others). The processing task is used for processing image files in a directory in one application node and transmitting a processing result to another application node. For the sake of description, the synchronization task will be taken as an example to describe more details about example embodiments of the present disclosure.

Figure 3:
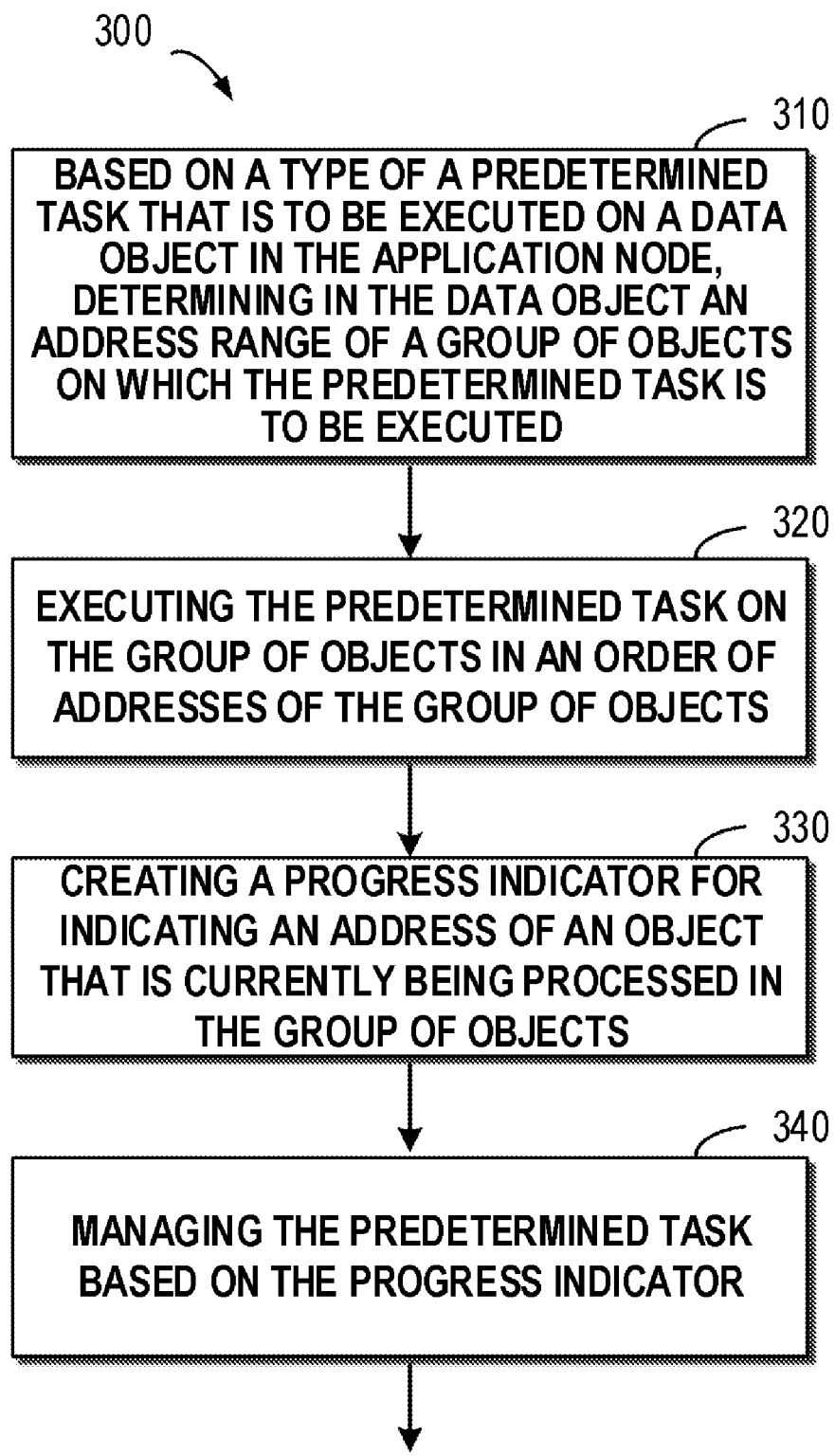
FIG. 3 schematically shows a flowchart of a method for managing a task in an application node according to example embodiments of the present disclosure.

With reference to FIG. 3, description is presented to more details about example embodiments of the present disclosure. The figure schematically shows a flowchart of a method 300 for managing a task in an application node according to example embodiments of the present disclosure. At block 310, an address range 230 of a group of objects 212 on which the predetermined task 220 will be executed among data object 210 may be determined based on the type of a predetermined task 220 to be executed on the data object 210.

With reference to different types of the predetermined task 220, description is presented on how to determine the address range 230 of the group of objects 212. According to example embodiments of the present disclosure, the type of the predetermined task 220 may comprise a traversing task, which indicates that the predetermined task 220 is to be executed on all objects in the data object 210. As described above, the data object 210 may comprise a directory and/or a file. When the data object 210 is a directory, the traversing task needs to traverse each object (including a directory and/or a file) in the data object 210, and the predetermined task 220 needs to be executed on each object.

It will be understood that two cases may arise when executing the predetermined task 220: an initial case and a subsequent case. Description is presented below with reference to synchronizing all objects under one directory from the application node 120 to the application node 130. In the initial case, the user has never previously executed a synchronization operation from the application node 120 to the application node 130, at which point all objects in the data object 210 need to be synchronized to the application node 130. In the subsequent case, if the user has previously executed a synchronization operation to the application node 130, then at this point not all objects in the data object 210 need to be synchronized to the application node 130, but only a portion that is changed between two synchronizations needs to be synchronized to the application node 130.

First, an example of the initial case is described. Initially, all subdirectories and files under the directory to which the data object 210 belongs need to be synchronized to the application node 130. At this point, an index describing a hierarchy structure of the data object 210 may be obtained, and the address range 230 may be determined based on the index. More details about the index will be described with reference to FIG. 4, which schematically shows a block diagram of an index 400 of the data object 210 according to example embodiments of the present disclosure.

Figure 4:
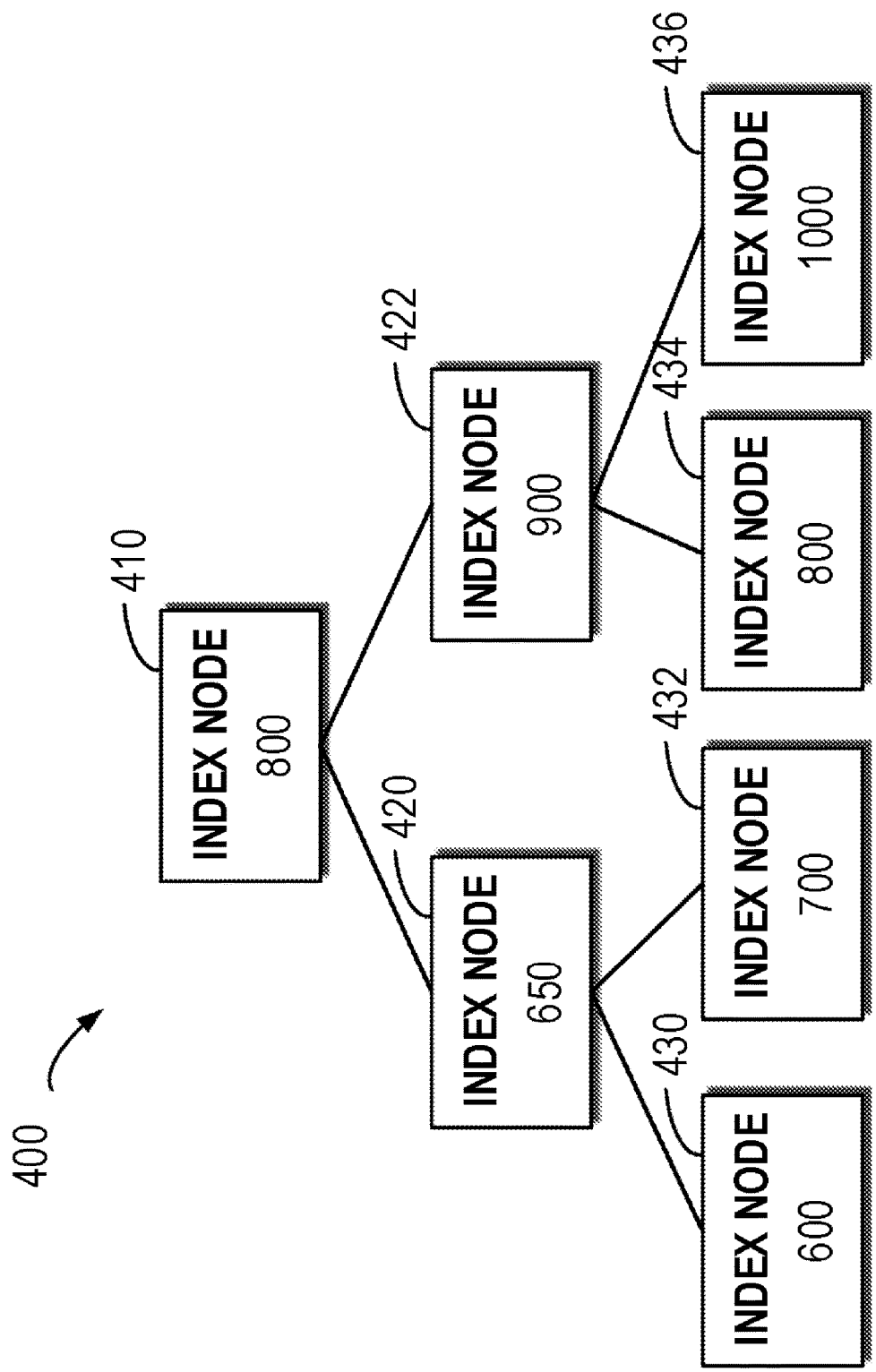
FIG. 4 schematically shows a block diagram of an index of a data object according to example embodiments of the present disclosure.

It will be understood that FIG. 4 merely illustrates an example of the index 400, which may comprise a plurality of index nodes. An index node 410 is a root node of the data object 210, the root node corresponding to the directory to which the data object 210 belongs. The index node 410 may comprise two child nodes: an index node 420 and an index node 422. Furthermore, the index nodes 420 and 422 may comprise directly or indirectly-related child nodes: index nodes 430, 432, 434 and 436.

As shown in FIG. 4, the index 400 may be stored in the form of a binary tree, wherein each index node may be represented using a hash of a corresponding object. Here, a value recorded in each index node may represent a hash of an object. For example, the hash of the root directory of the data object 210 may be "800" (corresponding to the index node 410), and a hash of a file in the data object 210 may be "600" (corresponding to the index node 430). It will be understood that FIG. 4 only illustrates one example of the index 400 in the form of a binary tree, according to example embodiments of the present disclosure, the index may further be built as other data structures, such as a binary tree, a multi-way tree, a B+ tree, etc.

According to example embodiments of the present disclosure, various nodes in the index 400 may be traversed according to a depth-first rule, and a plurality of index nodes in the index 400 may be sorted. As shown in FIG. 4, since the index 400 is represented as a binary tree and the hash value of the index node 410 that serves as the root is 800, based on rules of the binary tree, the index node 420 whose hash value is less than 800 may serve as a left child node of the index node 410, the index node 422 whose hash value is larger than or equal to 800 may serve as a right child node of the index node 410, and so on and so forth.

As shown in FIG. 4, it is clear based on traversing the index 400 that a range of hash values of various objects in the to-be-synchronized data object 210 is between 600 and 1000, so it may be determined that, in the data object 210, the address range of the group of objects 212 on which the predetermined task 220 will be executed is between 600 and 1000. Suppose each leaf node corresponds to one object in the data object 210, then the group of objects 212 to be processed comprise: an object represented by the index node 430, an object represented by the index node 432, an object represented by the index node 434 as well as an object represented by the index node 436.

Now that operations in the initial case have been described with reference to FIG. 4, details about incremental operations in the subsequent case will be described with reference to FIG. 5. According to example embodiments of the present disclosure, an incremental task indicates that the predetermined task 220 is to be executed on the group of objects which have been changed in the data object 210. If it is determined that the type of the predetermined task 220 is an incremental task, then a group of changed objects in the data object 210 may be obtained, and the address range may be determined based on the group of changed objects.

Continuing the example described with reference to FIG. 4, suppose the data object 210 associated with the index 400 shown in FIG. 4 has been synchronized from the application node 120 to the application node 130. After a period of time, the objects represented by the index nodes 432 and 434 are changed, and it is desirable to re-execute the synchronization task to the application node 130. At this point, since only the objects represented by the index nodes 432 and 434 have been changed, only objects associated with these two index nodes need to be transmitted to the application node 130. The address range may be determined based on the two changed objects.

According to example embodiments of the present disclosure, the address range may be determined based on hashes of the changed objects. At this point, the address range may be represented as a hash 700 and a hash 800 in enumerations. According to example embodiments of the present disclosure, the address range may be determined based on identifiers of the two changed objects. According to example embodiments of the present disclosure, object identifiers of changed objects may be stored in a list. At this point, the list may comprise two object identifiers, i.e., identifiers of the objects represented by the index nodes 432 and 434. At this point, the address range may be determined using locations of the object identifiers. For example, the address range may be represented as integers 0 to 1.

Description has been presented to related embodiments when the data object 210 is a directory. It will be understood that the data object 210 may further comprise a file. At this point, the type of the predetermined task 220 may be a file task, and the type indicates that the data object 210 is a file and the predetermined task 220 is to be executed on the file. According to example embodiments of the present disclosure, in accordance with determining that the type of the predetermined task 220 is a file task, a size of the data object 210 may be obtained, and the address range may be determined based on the size of the file. For example, suppose the size of the to-be-processed file is 10 TB, at this point the address range may be set as [0, 10 TB).

Description has been presented on how to determine in the data object 210 the address range of the group of objects 212 on which the predetermined task 220 will be executed based on the type of the predetermined task 220. When the address range of the group of objects 212 has been determined, the group of objects 212 to be processed may be sorted in an order of addresses. Returning to FIG. 3, at block 320, the predetermined task 220 may be executed on the group of objects 212 in an order of addresses of the group of objects 212. It will be understood that when the type of the predetermined task 220 differs, the address may be represented in a different way. Therefore, the group of objects 212 may be sorted in different ways.

According to example embodiments of the present disclosure, when the predetermined task 220 is a traversing task, the group of objects 212 may be sorted in an order of hashes. For example, still with reference to the example in FIG. 4, each leaf node represents an index node of a to-be-processed object, so the group of objects 212 may be sorted by values of hashes: the object represented by the index node 430, the object represented by the index node 432, the object represented by the index node 434, and the object represented by the index node 436. According to example embodiments of the present disclosure, when the predetermined task 220 is an incremental task and changed data only comprises two objects, the group of objects 212 may be sorted by hashes of changed objects: the object represented by the index node 432 and the object represented by the index node 434. According to example embodiments of the present disclosure, when the predetermined task 220 is a file task, various data blocks (e.g., divided by storage units of a storage system) in the file may be sorted in an order of addresses.

Each object in the group of objects 212 may be sequentially processed one by one. Returning to FIG. 3, at block 330, a progress indicator may be created for indicating an address of an object which is currently being processed in the group of objects 212. FIG. 5 schematically shows a block diagram 500 of a progress indicator according to example embodiments of the present disclosure. As depicted, each object may be processed one by one. In FIG. 5, an object 510 which has been processed in the group of objects 212 is shown as a stripe legend, an object 520 which is currently being processed in the group of objects 212 is shown as a diamond legend, and an object 530 which is not yet processed in the group of objects 212 is shown as a blank legend. A progress indicator 240 may be set to point to the object 520 which is currently being processed.

It will be understood that the progress indicator 240 here may describe a state that the predetermined task 220 has been executed, and subsequently the predetermined task 220 may be managed in an easier and more effective way based on the progress indicator 240. Returning to FIG. 3, at block 340 the predetermined task 220 may be executed based on the progress indicator 240.

According to example embodiments of the present disclosure, if it is determined that a failure occurs in the application node 120, then the application node 120 may be restarted. It will be understood that since the progress indicator 240 records an object on which the predetermined task 220 is currently being executed, after the application node 120 is restarted, there is no need to process all objects in the data object 210 from the beginning, but the predetermined task 220 may be continued based on the progress indicator 240.

Figure 5:
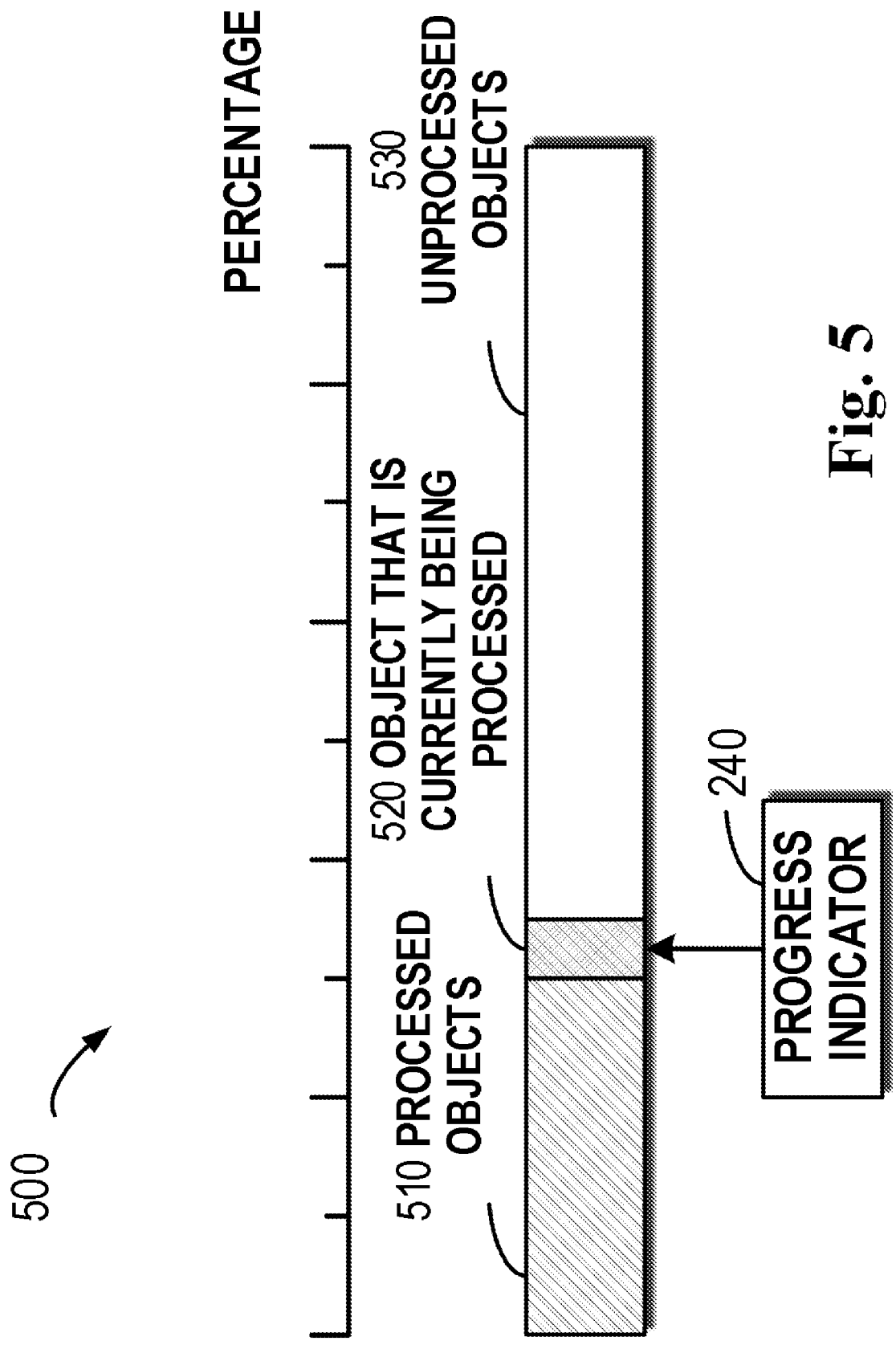
FIG. 5 schematically shows a block diagram of a progress indicator according to example embodiments of the present disclosure.

With reference to FIG. 5, suppose the application node 120 fails when the progress indicator 240 points to the object 520, after the application node 120 is restarted, synchronization may be performed with respect to the objects 520 and 530, but the object 510 does not need to be re-synchronized between the application nodes 120 and 130. By means of example embodiments of the present disclosure, the efficiency of the synchronization task may be improved, and a processed portion may be prevented from being re-synchronized. It will be understood that although the processed object 520 and the object 530 which has not been processed are shown as one block in FIG. 5, the objects 520 and 530 each may comprise one or more objects.

Description has been presented to the example of executing the synchronization task on the group of objects 212 in series. It will be understood that when the to-be-processed data object 210 has a large data amount, in order to improve the processing efficiency, a plurality of objects which have not been processed may be grouped, and then the synchronization task may be executed on a plurality of groups in parallel. According to example embodiments of the present disclosure, if it is determined that the predetermined task 220 has not been completed within a predetermined period, then a portion of the group of objects 212 which have not been processed are divided into at least a first portion and a second portion, and the predetermined task 220 may be executed on the first portion and the second portion, respectively. With example embodiments of the present disclosure, it is possible to sufficiently utilize more processing resources to process various portions in the data object 210 in parallel.

Figure 6:
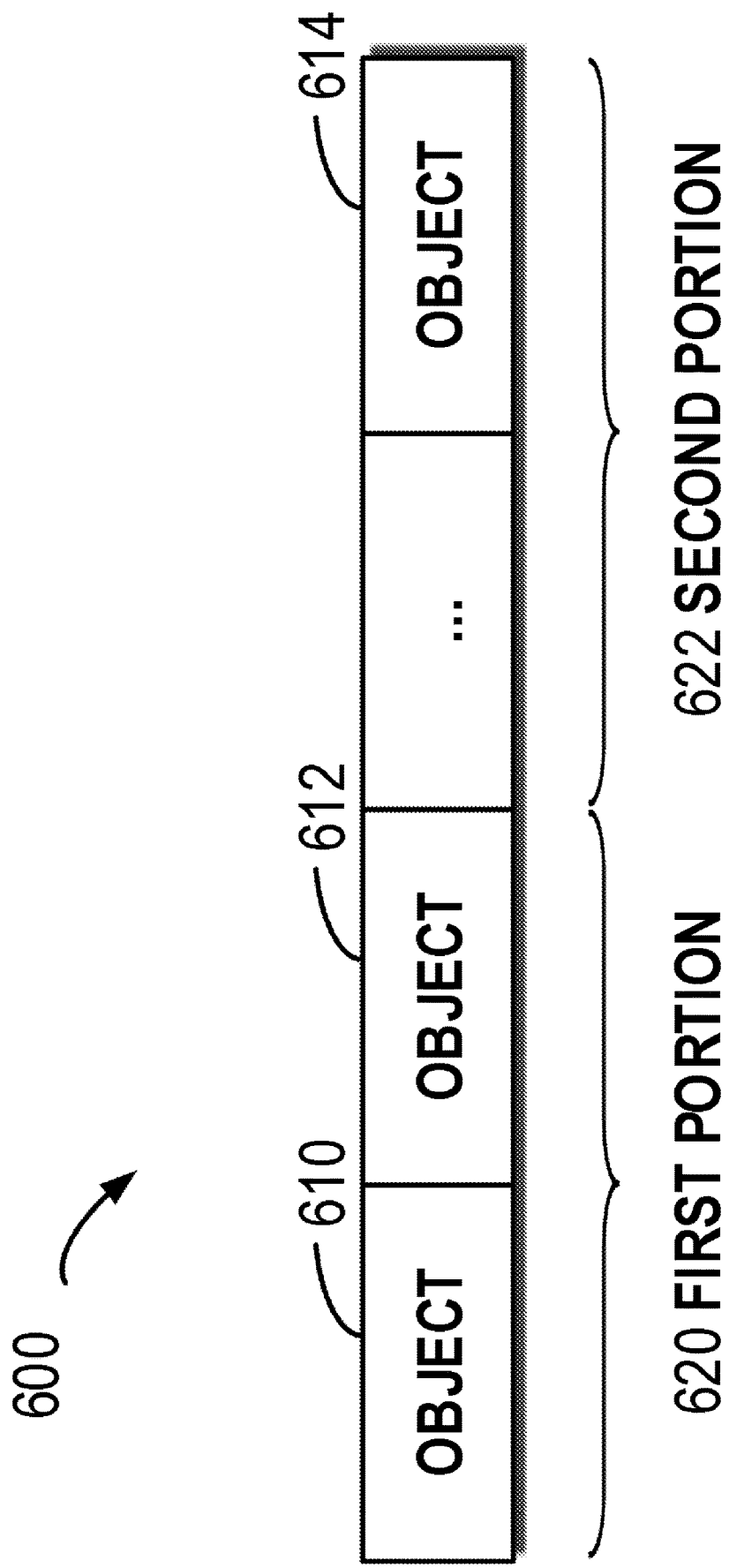
FIG. 6 schematically shows a block diagram of the procedure for dividing an unprocessed address range into a first portion and a second portion according to example embodiments of the present disclosure.

FIG. 6 schematically shows a block diagram 600 of the procedure for dividing an address range which has not been processed into a first portion and a second portion according to example embodiments of the present disclosure. FIG. 6 shows a group of objects (comprising objects 610, 612, . . . , and 614) which are sorted according to addresses and have been not processed. The group of objects may be divided into a first portion 620 and a second portion 622. It will be understood that although FIG. 6 schematically shows two portions, according to example embodiments of the present disclosure, the group of objects 212 may further be divided into more portions. Subsequently, a processing resource may be allocated to each portion.

According to example embodiments of the present disclosure, the predetermined period specifies a cycle of performing the dividing operation. The larger is the predetermined period, the longer is the cycle of performing the dividing operation. Specifically, if the predetermined period is too long, then the time when the predetermined task is completed may be earlier than the expiration of the predetermined period, at which point the advantage of parallel processing is not sufficiently utilized. If the predetermined period is too short, then the predetermined period may expire before one object has been processed, at which point the dividing operation will be immediately started. Therefore, a value of the predetermined period may be set and adjusted based on the data amount of the data object and an estimated processing time.

Figure 7A:
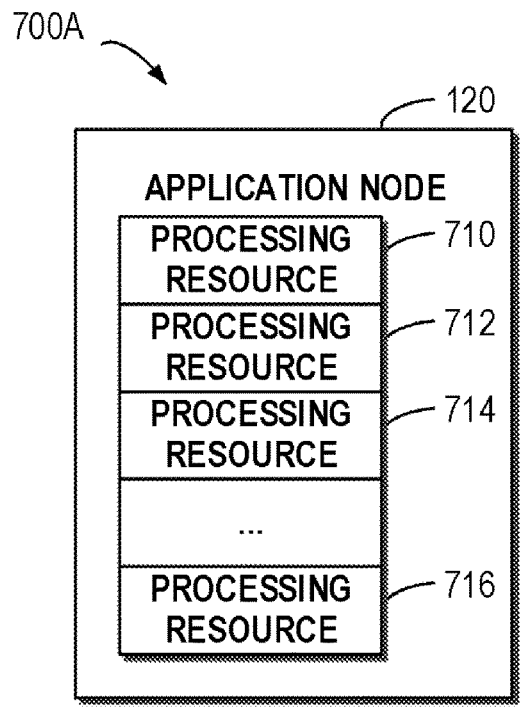
FIG. 7A schematically shows a block diagram of a queue of processing resources in an application node according to example embodiments of the present disclosure.

According to example embodiments of the present disclosure, the application node may comprise a plurality of processing resources. FIG. 7A schematically shows a block diagram 700A of a queue of processing resources in the application node 120 according to example embodiments of the present disclosure. The application node 120 may comprise a queue of processing resources, and the queue may comprise a plurality of processing resources 710, 712, 714, . . . , and 716. According to example embodiments of the present disclosure, the predetermined period may be set to 1 minute. In the initial stage, the processing resource 710 may be allocated at the application node 120 for synchronization. Accordingly, synchronous data from the application node 120 may be received using a processing resource at the application node 130.

Figure 7B:
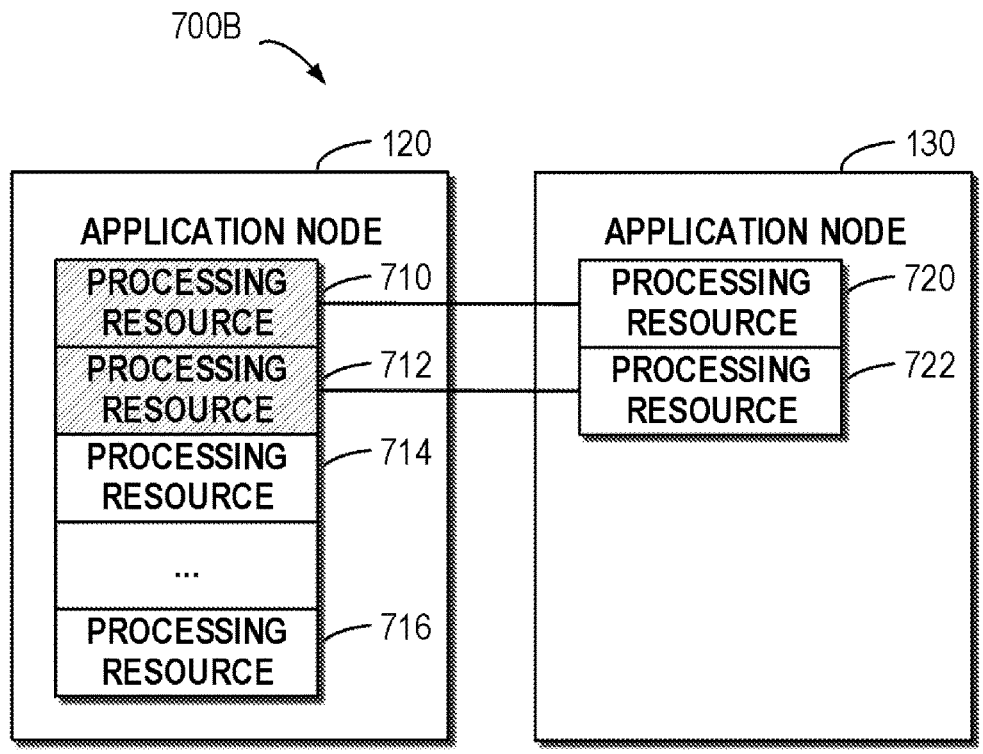
FIG. 7B schematically shows a block diagram of processing a predetermined task by using processing resources according to example embodiments of the present disclosure.

If the synchronization task is not completed with respect to all data in the data object 210 within the predetermined period, then a portion of the group of objects 212 which have not been synchronized may be divided into a first portion and a second portion, and a next processing resource may be allocated from the queue of resources. FIG. 7B schematically shows a block diagram 700B for processing the predetermined task 220 by using processing resources according to example embodiments of the present disclosure. As depicted, the processing resource 710 may be used to execute the synchronization task on the first portion, and the processing resource 712 may be used to execute the synchronization task on the second portion. Accordingly, at the application node 130, the processing resources 720 and 722 may receive synchronous data from the application node 120. With example embodiments of the present disclosure, processing resource(s) may be started at the application node 130 in view of the number of processing resources which have been allocated at the application node 120. In this way, a processing resource at the application node 130 may be scheduled according to a workload. According to example embodiments of the present disclosure, the processing resource may be represented using a unique identifier.

Figure 8:
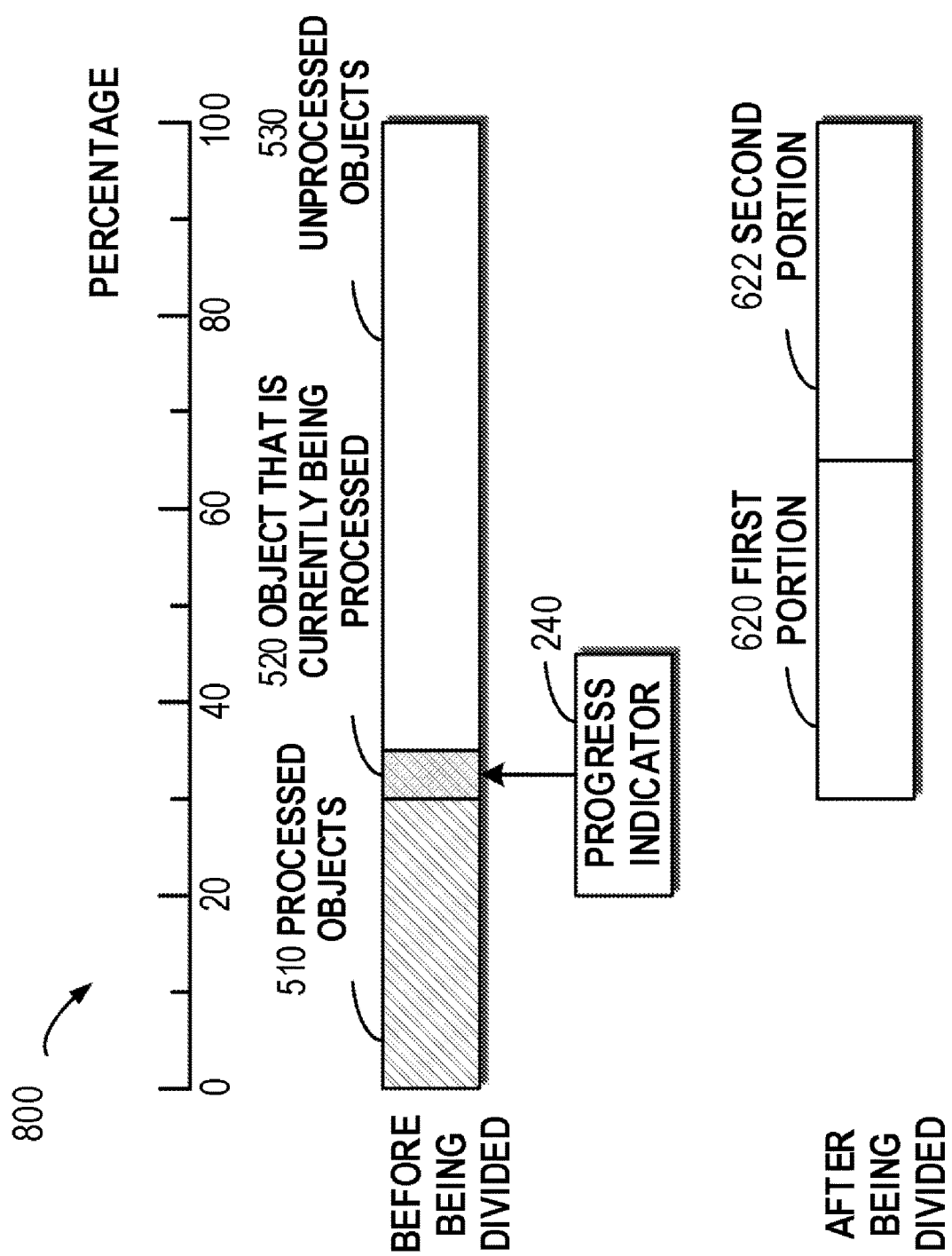
FIG. 8 schematically shows a block diagram of unprocessed objects before and after the dividing according to example embodiments of the present disclosure.

According to example embodiments of the present disclosure, an unprocessed address range of a portion of the group of objects 212 which have not been processed may be determined based on the progress indicator 240 and the address range 230. FIG. 8 schematically shows a block diagram 800 of unprocessed objects before and after the dividing according to example embodiments of the present disclosure. As depicted, a processing resource in the application node 120 may serially synchronize various objects to the application node 130. The progress indicator 240 points to the object which is currently being processed, and an address of the object 520 is at 30% of the whole address range. When the synchronization task is not completed within the predetermined time, an unprocessed address range may be divided into at least a first portion 620 and a second portion 622. The percentage of unprocessed objects is 1-30%=70%, so the first portion 620 and the second portion 622 each may comprise 70%/2=35% of the unprocessed objects.

Subsequently, two processing resources in the application node may process the two portions 620 and 622, respectively. Specifically, the predetermined task may be executed on the first portion and the second portion in parallel. According to example embodiments of the present disclosure, the method 300 described with reference to FIG. 3 may be performed by taking the first portion 620 as the independent data object 210, and at the same time the method 300 described with reference to FIG. 3 may be performed by taking the second portion 622 as the independent data object 210. Here, the predetermined task 220 is executed on the two portions in the same way, so description is only presented on how to execute the predetermined task 220 on the first portion. A first progress indicator may be created for indicating an address of an object in the first portion 620 which is currently being processed, and the predetermined task 220 may be executed on the first portion 620 based on the first progress indicator.

According to example embodiments of the present disclosure, processing may be performed with respect to different types of predetermined tasks 220. Returning to FIG. 4, description is presented to more details about a task of synchronizing a directory from the application node 120 to the application node 130. If the synchronization task is not completed within the predetermined period, then unprocessed objects may be divided into two portions based on the address range. For example, suppose the object represented by the index node 430 has been synchronized, at this point it may be determined that the dividing boundary is (700+ 1000)/2=850. Objects (whose hashes are less than 850) represented by the index nodes 432 and 434 may act as the first portion, and object (whose hash is larger than or equal to 850) represented by the index node 436 may act as the second portion.

According to example embodiments of the present disclosure, unprocessed objects may be evenly divided based on the number of unprocessed objects. According to example embodiments of the present disclosure, the dividing may be based on the data amount of objects to be processed. For example, the total data amount of objects in the first portion 620 may be similar to that of objects in the second portion 622.

Regarding an incremental task, suppose the synchronization of objects represented by the index nodes 430 and 432 from the application node 120 to the application node 130 is not completed within the predetermined time period, then unprocessed objects may be divided into two portions. At this point, each portion may comprise one object. Regarding a file task, suppose the synchronization of a file from the application node 120 to the application node 130 is not completed within the predetermined time period, then a to-be-synchronized portion of the file may be divided into two or more portions.

Figure 9:
FIG. 9 schematically shows a block diagram of dividing a file at different time points according to example embodiments of the present disclosure.

FIG. 9 schematically shows a block diagram 900 of dividing a file at different time points according to example embodiments of the present disclosure. Suppose an identifier of the file is LIN1000384b, the file may be divided several times at a plurality of time points. For example, the file starts to be synchronized at an initial time point T0. At a time point T1, the file may be divided into two portions, at which point an address range of a first portion is [00000000, 62914560) and an address range of a second portion is [62914560, 125829120). At a time point T2, the first portion and the second portion may be further divided, respectively. In other words, each portion may be divided into two portions, so that four portions are formed. At a time point T3, the four portions formed at the time point T2 may be further divided, respectively, so that eight portions are formed.

According to example embodiments of the present disclosure, the file with a global unique file identifier is divided into a plurality of portions, and then a unique identifier may be set to each of the plurality of portions. According to example embodiments of the present disclosure, each portion may be uniquely identified by a combination of a global unique identifier of the processing resource and the file identifier. According to example embodiments of the present disclosure, each portion may be uniquely identified by a combination of the file identifier and a timestamp related to the file dividing. Alternatively and/or additionally, an identifier may be set to each portion based on a combination of the above.

While examples of the method according to the present disclosure have been described in detail with reference to FIGS. 2 to 9, description is presented below for embodiments of a corresponding apparatus. Specifically, an apparatus is provided for managing a task in an application node. The apparatus comprises: a determining module configured to, based on a type of a predetermined task that is to be executed on a data object in the application node, determine in the data object an address range of a group of objects on which the predetermined task is to be executed; an executing module configured to execute the predetermined task on the group of objects in an order of addresses of the group of objects; a creating module configured to create a progress indicator for indicating an address of an object that is currently being processed in the group of objects; and a managing module configured to manage the predetermined task based on the progress indicator.

According to example embodiments of the present disclosure, the managing module comprises: a restarting module configured to restart the application node in accordance with determining that the application node fails; and the executing module is further configured to continue an execution of the predetermined task based on the progress indicator.

According to example embodiments of the present disclosure, the managing module comprises: a dividing module configured to, in accordance with determining that the predetermined task is not completed within a predetermined period, divide a portion of the group of objects that are not yet processed into at least a first portion and a second portion; and the executing module is further configured to execute the predetermined task on the first portion and the second portion, respectively.

According to example embodiments of the present disclosure, the dividing module comprises: a range determining module configured to determine an unprocessed address range of the portion of the group of objects that are not yet processed; and a portion dividing module configured to divide the unprocessed address range into at least the first portion and the second portion.

According to example embodiments of the present disclosure, the executing module further comprises: a first executing module configured to execute the predetermined task on the first portion; create a first progress indicator for indicating an address of an object that is currently being processed in the first portion; and execute the predetermined task on the first portion based on the first progress indicator.

According to example embodiments of the present disclosure, the determining module comprises: an index obtaining module configured to, in accordance with determining that the type of the predetermined task is a traversing task, obtain an index of a hierarchy structure describing the data object, the traversing task representing that the predetermined task is to be executed on all objects in the data object; and a range determining module configured to determine the address range based on the index.

According to example embodiments of the present disclosure, the determining module comprises: a change obtaining module configured to, in accordance with determining that the type of the predetermined task is an incremental task, obtain a group of changed objects in the data object, the incremental task representing that the predetermined task is to be executed on the group of changed objects in the data object; and a range determining module configured to determine the address range based on the group of changed objects.

According to example embodiments of the present disclosure, the determining module comprises: a size obtaining module configured to, in accordance with determining that the type of the predetermined task is a file task, obtain a size of the data object, the file task representing that the data object is a file and the predetermined task is to be executed on the file; and a range determining module configured to determine the address range based on the size of the file.

According to example embodiments of the present disclosure, the application node comprises a plurality of processing resources, and the predetermined task is executed by one or more processing resources in the plurality of processing resources.

According to example embodiments of the present disclosure, the predetermined task comprises at least one of: synchronizing the data object from the application node to another application node; and processing the data object and transmitting a result of processing the data object to another application node.

Figure 10:
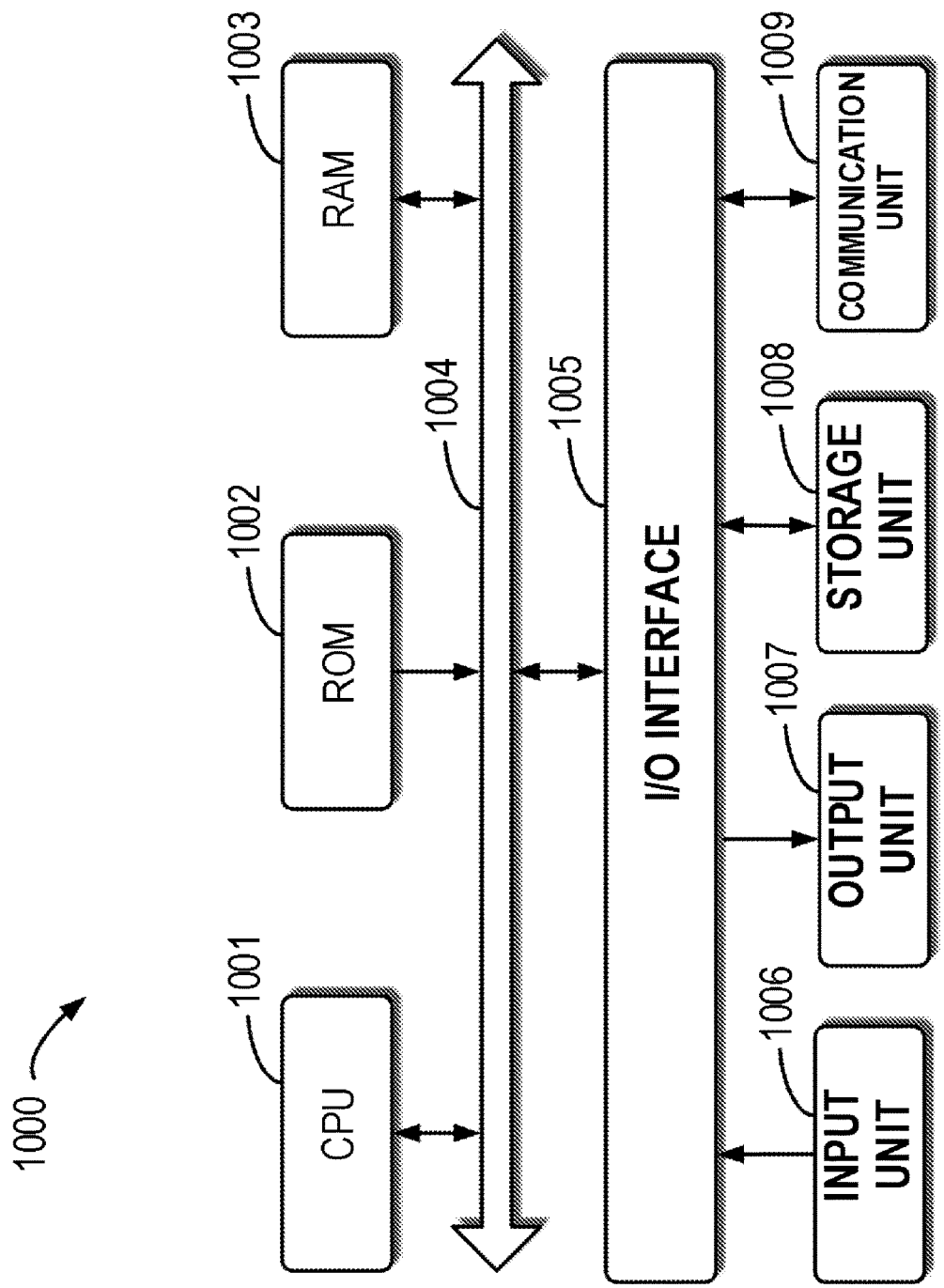
FIG. 10 schematically shows a block diagram of a device for managing a task in an application node according to example embodiments of the present disclosure.

FIG. 10 schematically shows a block diagram of a device 1000 for managing a task in an application node according to example embodiments of the present disclosure. As depicted, the device 1000 includes a central processing unit (CPU) 1001, which can execute various suitable actions and processing based on the computer program instructions stored in the read-only memory (ROM) 1002 or computer program instructions loaded in the random-access memory (RAM) 1003 from a storage unit 1008. The RAM 1003 can also store all kinds of programs and data required by the operations of the device 1000. CPU 1001, ROM 1002 and RAM 1003 are connected to each other via a bus 1004. The input/output (I/O) interface 1005 is also connected to the bus 1004.

A plurality of components in the device 1000 are connected to the I/O interface 1005, including: an input unit 1006, such as a keyboard, mouse and the like; an output unit 1007, e.g., various kinds of displays and loudspeakers etc.; a storage unit 1008, such as a magnetic disk and optical disk, etc.; and a communication unit 1009, such as a network card, modem, wireless transceiver and the like. The communication unit 1009 allows the device 1000 to exchange information/data with other devices via the computer network, such as Internet, and/or various telecommunication networks.

The above described process and treatment, such as the method 300 can also be executed by the processing unit 1001. For example, in some embodiments, the method 300 can be implemented as a computer software program tangibly included in the machine-readable medium, e.g., the storage unit 1008. In some embodiments, the computer program can be partially or fully loaded and/or mounted to the device 1000 via ROM 1002 and/or the communication unit 1009. When the computer program is loaded to the RAM 1003 and executed by the CPU 1001, one or more steps of the above described method 300 can be implemented. Alternatively, in other embodiments, the CPU 1001 can also be configured in other suitable ways to realize the above procedure/method.

According to example embodiments of the present disclosure, an electronic device is provided, the electronic device comprising: at least one processor; and a memory coupled to the at least one processor, the memory having instructions stored thereon, the instructions, when executed by the at least one processor, causing the device to perform acts for managing a task in an application node. The acts include: based on a type of a predetermined task that is to be executed on a data object in the application node, determining in the data object an address range of a group of objects on which the predetermined task is to be executed; executing the predetermined task on the group of objects in an order of addresses of the group of objects; creating a progress indicator for indicating an address of an object that is currently being processed in the group of objects; and managing the predetermined task based on the progress indicator.

According to example embodiments of the present disclosure, managing the predetermined task based on the progress indicator comprises: restarting the application node in accordance with determining that the application node fails; and continuing an execution of the predetermined task based on the progress indicator.

According to example embodiments of the present disclosure, managing the predetermined task based on the progress indicator comprises: in accordance with determining that the predetermined task is not completed within a predetermined period, dividing a portion of the group of objects that are not yet processed into at least a first portion and a second portion; and executing the predetermined task on the first portion and the second portion, respectively.

According to example embodiments of the present disclosure, dividing the portion of the group of objects that are not yet processed into at least a first portion and a second portion comprises: determining an unprocessed address range of the portion of the group of objects that are not yet processed; and dividing the unprocessed address range into at least the first portion and the second portion.

According to example embodiments of the present disclosure, executing the predetermined task on the first portion and the second portion respectively comprises: executing the predetermined task on the first portion; creating a first progress indicator for indicating an address of an object that is currently being processed in the first portion; and executing the predetermined task on the first portion based on the first progress indicator.

According to example embodiments of the present disclosure, determining, in the data object, the address range of the group of objects on which the predetermined task is to be executed based on the type of the predetermined task that is to be executed on the data object comprises: in accordance with determining that the type of the predetermined task is a traversing task, obtaining an index of a hierarchy structure describing the data object, the traversing task representing that the predetermined task is to be executed on all objects in the data object; and determining the address range based on the index.

According to example embodiments of the present disclosure, determining, in the data object, the address range of the group of objects on which the predetermined task is to be executed based on the type of the predetermined task that is to be executed on the data object, comprises: in accordance with determining that the type of the predetermined task is an incremental task, obtaining a group of changed objects in the data object, the incremental task representing that the predetermined task is to be executed on the group of changed objects in the data object; and determining the address range based on the group of changed objects.

According to example embodiments of the present disclosure, determining, in the data object, the address range of the group of objects on which the predetermined task is to be executed based on the type of the predetermined task that is to be executed on the data object, comprises: in accordance with determining that the type of the predetermined task is a file task, obtaining a size of the data object, the file task representing that the data object is a file and the predetermined task is to be executed on the file; and determining the address range based on the size of the file.

According to example embodiments of the present disclosure, the application node comprises a plurality of processing resources, and the predetermined task is executed by one or more processing resources in the plurality of processing resources.

According to example embodiments of the present disclosure, the predetermined task comprises at least one of: synchronizing the data object from the application node to another application node; and processing the data object and transmitting a result of processing the data object to another application node.

According to example embodiments of the present disclosure, there is provided a computer program product. The computer program product is tangibly stored on a non-transitory computer-readable medium and comprises machine-executable instructions which are used to implement the method according to the present disclosure.

According to example embodiments of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to embodiments of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of embodiments of the present disclosure. In this regard, each block in the flow chart or block diagram can represent a module, a part of program segment or code, wherein the module and the part of program segment or code include one or more executable instructions for performing stipulated logic functions. In some alternative embodiments, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable others of ordinary skill in the art to understand embodiments of the present disclosure.

What is claimed is:

1. A method, comprising:
based on a type of a predetermined task that is to be executed on a data object in an application node, determining, in the data object by a system comprising a processor, an address range of a group of objects on which the predetermined task is to be executed;
executing the predetermined task on the group of objects in an order of addresses of the group of objects during a predetermined period that is based on a data amount of the group of objects;
creating a progress indicator for indicating an address of an object that is currently being processed in the group of objects; and
managing the predetermined task based on the progress indicator;
wherein managing the predetermined task based on the progress indicator comprises:
in accordance with determining that the predetermined period ends before the predetermined task is completed,
dividing a portion of the group of objects that are not yet processed into at least a first portion and a second portion, and
executing the predetermined task on the first portion and the second portion respectively.

2. The method of claim 1, wherein managing the predetermined task based on the progress indicator further comprises:
restarting the application node in accordance with determining that the application node fails; and
continuing an execution of the predetermined task based on the progress indicator.

3. The method of claim 1, wherein dividing the portion of the group of objects that are not yet processed into at least the first portion and the second portion comprises:
determining an unprocessed address range of the portion of the group of objects that are not yet processed; and
dividing the unprocessed address range into at least the first portion and the second portion.

4. The method of claim 1, wherein executing the predetermined task on the first portion and the second portion respectively comprises:
creating the progress indicator to indicate an address of an object that is currently being processed in the first portion; and
executing the predetermined task on the first portion based on the progress indicator.

5. The method of claim 1, wherein determining, in the data object, the address range of the group of objects on which the predetermined task is to be executed based on the type of the predetermined task that is to be executed on the data object comprises:
in accordance with determining that the type of the predetermined task is a traversing task, obtaining an index of a hierarchy structure describing the data object, the traversing task representing that the predetermined task is to be executed on all objects in the data object; and determining the address range based on the index.

6. The method of claim 1, wherein determining, in the data object, the address range of the group of objects on which the predetermined task is to be executed based on the type of the predetermined task that is to be executed on the data object comprises:

in accordance with determining that the type of the predetermined task is an incremental task, obtaining a group of changed objects in the data object, the incremental task representing that the predetermined task is to be executed on the group of changed objects in the data object; and determining the address range based on the group of changed objects.

7. The method of claim 1, wherein determining, in the data object, the address range of the group of objects on which the predetermined task is to be executed based on the type of the predetermined task that is to be executed on the data object comprises:

in accordance with determining that the type of the predetermined task is a file task, obtaining a size of the data object, the file task representing that the data object is a file and the predetermined task is to be executed on the file; and determining the address range based on the size of the file.

8. The method of claim 1, wherein the application node comprises a plurality of processing resources, and the predetermined task is executed by one or more processing resources in the plurality of processing resources.

9. An electronic device, comprising:

at least one processor; and a memory coupled to the at least one processor, the memory having instructions stored thereon, the instructions, when executed by the at least one processor, causing the electronic device to implement acts for managing a predetermined task in an application node, the acts comprising:

based on a type of the predetermined task that is to be executed on a data object in the application node, determining in the data object an address range of a group of objects on which the predetermined task is to be executed;

executing, using a first processing resource, the predetermined task on the group of objects in an order of addresses of the group of objects during a predetermined period that is based on a data amount of the group of objects;

creating a progress indicator for indicating an address of an object that is currently being processed in the group of objects; and managing the predetermined task based on the progress indicator;

wherein managing the predetermined task based on the progress indicator comprises:

in accordance with determining that the predetermined period has ended before the predetermined task is completed, dividing a portion of the group of objects that are not yet processed into at least a first portion and a second portion; and executing the predetermined task on the first portion and the second portion, using the first processing resource and a second processing resource, respectively, wherein the second processing resource is a different processing resource than the first processing resource.

10. The electronic device of claim 9, wherein managing the predetermined task based on the progress indicator further comprises:

restarting the application node in accordance with determining that the application node fails; and continuing an execution of the predetermined task based on the progress indicator.

11. The electronic device of claim 9, wherein dividing the portion of the group of objects that are not yet processed into at least the first portion and the second portion comprises:

determining an unprocessed address range of the portion of the group of objects that are not yet processed; and dividing the unprocessed address range into at least the first portion and the second portion.

12. The electronic device of claim 9, wherein executing the predetermined task on the first portion and the second portion, using the first processing resource and the second processing resource, respectively comprises:

creating the progress indicator for indicating an address of an object that is currently being processed in the first portion; and executing the predetermined task on the first portion based on the progress indicator.

13. The electronic device of claim 9, wherein determining, in the data object, the address range of the group of objects on which the predetermined task is to be executed based on the type of the predetermined task that is to be executed on the data object comprises:

in accordance with determining that the type of the predetermined task is a traversing task, obtaining an index of a hierarchy structure describing the data object, the traversing task representing that the predetermined task is to be executed on all objects in the data object; and determining the address range based on the index.

14. The electronic device of claim 9, wherein determining, in the data object, the address range of the group of objects on which the predetermined task is to be executed based on the type of the predetermined task that is to be executed on the data object comprises:

in accordance with determining that the type of the predetermined task is an incremental task, obtaining a group of changed objects in the data object, the incremental task representing that the predetermined task is to be executed on the group of changed objects in the data object; and determining the address range based on the group of changed objects.

15. The electronic device of claim 9, wherein determining, in the data object, the address range of the group of objects on which the predetermined task is to be executed based on the type of the predetermined task that is to be executed on the data object comprises:

in accordance with determining that the type of the predetermined task is a file task, obtaining a size of the data object, the file task representing that the data object is a file and the predetermined task is to be executed on the file; and determining the address range based on the size of the file.

16. The electronic device of claim 9, wherein the application node comprises a plurality of processing resources, and the predetermined task is executed by one or more processing resources in the plurality of processing resources.

17. A non-transitory machine-readable medium, comprising executable instructions that, when executed by a processor of an electronic device, facilitate performance of operations, comprising:
- based on a type of a predetermined task that is to be executed on a data object in an application node, determining in the data object an address range of a group of objects on which the predetermined task is to be executed, wherein the predetermined task comprises application of removing noise from an image of the data object;
- executing, using a first processing resource, the predetermined task on the group of objects in an order of addresses of the objects of the group during a predetermined period;
- creating a progress indicator for indicating an address of an object that is currently being processed in the group of objects; and
- managing the predetermined task based on the progress indicator;
- wherein managing the predetermined task based on the progress indicator comprises:
  - determining that the predetermined period ends before the predetermined task is completed,
  - dividing a portion of the group of objects that are not yet processed into at least a first portion and a second portion; and
  - executing the predetermined task on the first portion and the second portion, using the first processing resource and a second processing resource, respectively, wherein the second processing resource is a different processing resource than the first processing resource.

18. The non-transitory machine readable medium of claim 17, wherein the predetermined task comprises at least one of:
- synchronizing the data object from the application node to another application node; and
- processing the data object and transmitting a result of processing the data object to the another application node.

19. The non-transitory machine readable medium of claim 17, wherein managing the predetermined task based on the progress indicator further comprises:
- restarting the application node in accordance with determining that the application node has failed; and
- continuing an execution of the predetermined task based on the progress indicator.

20. The non-transitory machine readable medium of claim 17, wherein dividing the portion of the group of objects that are not yet processed into at least the first portion and the second portion comprises:
- determining an unprocessed address range of the portion of the group of objects that are not yet processed; and
- dividing the unprocessed address range into at least the first portion and the second portion.

* * * * *